United States Patent
Fendt et al.

(10) Patent No.: US 6,456,915 B1
(45) Date of Patent: Sep. 24, 2002

(54) METHOD FOR OPERATING AN OCCUPANT SAFETY DEVICE AND CONTROL UNIT

(75) Inventors: Günter Fendt; Jörg Flerlage, both of Schrobenhausen; Manfred Herz, Mainz; Norbert Müller; Wolfgang Peter, both of Schrobenhausen; Hans Spies, Pfaffenhofen; Jani Skedelj, *deceased*, late of Grossnoebach, all of (DE), by Ivanka Skedelj and Josch Skedelj, legal representatives

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/656,807

(22) Filed: Sep. 11, 2000

Related U.S. Application Data

(63) Continuation-in-part of application No. PCT/EP99/01347, filed on Mar. 2, 1999.

(30) Foreign Application Priority Data

Mar. 7, 1998 (DE) ......................................... 198 09 927
Sep. 15, 1998 (DE) ......................................... 198 42 083

(51) Int. Cl.$^7$ ............................................. B60R 21/32
(52) U.S. Cl. ........................... 701/45; 701/46; 280/735; 180/274; 307/10.1
(58) Field of Search ...................... 701/45, 46; 280/734, 280/735; 180/274, 282; 307/10.1

(56) References Cited

U.S. PATENT DOCUMENTS

| | | | | |
|---|---|---|---|---|
| 3,980,318 A | * | 9/1976 | Balban | ........................ 180/274 |
| 4,163,268 A | * | 7/1979 | Spies et al. | ................. 280/735 |
| 4,220,871 A | * | 9/1980 | Yasui et al. | .................. 180/274 |
| 5,058,920 A | * | 10/1991 | Burger et al. | ................ 280/735 |
| 5,204,547 A | | 4/1993 | Schumacher et al. | .......... 307/10 |
| 5,225,986 A | * | 7/1993 | Mickeler et al. | ............ 307/10.1 |
| RE34,637 E | * | 6/1994 | Burger et al. | .............. 280/735 |
| 5,596,497 A | | 1/1997 | Honda | ................. 364/424.055 |
| 5,675,242 A | | 10/1997 | Nakano | ....................... 323/312 |

FOREIGN PATENT DOCUMENTS

| | | |
|---|---|---|
| DE | 37 29 785 C1 | 9/1987 |
| DE | 196 38 457 C1 | 9/1996 |
| EP | 0 805 074 A1 | 4/1997 |
| EP | 0 813 998 A1 | 6/1997 |
| EP | 0 816 186 A1 | 6/1997 |

* cited by examiner

*Primary Examiner*—Gary Chin
(74) *Attorney, Agent, or Firm*—Venable; Norman N. Kunitz

(57) ABSTRACT

The invention relates to a method for operating an occupant safety device and a control unit for performing the method. To limit the power supplied to a triggering means from a storage element, the electrical power supplied after operating each triggering means is measured and after a definable power limiting value has been reached the power supplied to the triggering means is interrupted. The known methods based on the voltage at the storage element being the measure of the power supplied prove to be highly prone to error because these depend firstly on the charged state of the storage element and secondly very much on the conductor resistance so that incorrect control action can result. By integrating a variable that is proportional to the square of the current flowing through the triggering means to an integral value and comparing this rather than the voltage with the power limiting value, a simple way of simply and accurately determining the supply of power in the triggering circuit of occupant safety devices is possible irrespective of the conductor resistance.

7 Claims, 2 Drawing Sheets

METHOD FOR OPERATING AN OCCUPANT SAFETY DEVICE AND CONTROL UNIT

This application is a continuation-in-part of PCT/EP99/01347, filed Mar. 2, 1999.

BACKGROUND OF THE INVENTION

The invention relates to a method for operating an occupant safety device as well as a control unit, in particular for performing the method.

A method of this kind is known from DE 37 29 785 C1 (or its corresponding U.S. Pat. Reissue No. 34,637). As described in DE 37 29 785 C1, the supplied electrical power is to be established by measuring the voltage at the storage element, comparing it with a desired value and interrupting the power supply if it falls short of this value. This method can be expanded in accordance with column 5, lines 34 to 42 of DE 37 29 785 C1 by measuring the current flowing through the triggering means at the same time as measuring the voltage. The description of DE 37 29 785 C1 is limited to these two examples of embodiment in which in both cases the voltage is given as the variable to be measured. The voltage of the storage element, however, displays a major disadvantage when determining the supplied energy because it depends on the charged state of the storage element. In DE-OS 37 38 862 from the same applicant as DE 37 29 785 C1, this disadvantage is indeed recognized in principle (cf. column 1, lines 29 to 40 of DE-OS 37 38 862), but only a time control is considered as solution. As described in DE 37 29 785 C1, it is not possible to supply more than one triggering means, for instance airbag squibs, in the same time from one common storage element with an controlled amount of energy.

Another disadvantage of DE 37 29 785 C1 is that the accuracy in determining the power supplied to the triggering means by measuring the voltage depends very much on the conductor resistance. In practice, it has been found that the total resistance comprising the triggering means as such (2 ohm) and the conductor (varying between 0 and 4 ohm) depends heavily on the latter. The power that is effectively supplied to the triggering means can therefore be considerably less than that which can be determined from the voltage at the storage element.

From DE 196 24 357 C1, an ignition circuit output stage is known for triggering occupant safety systems in motor vehicles, where there is mention not only of a deactivated but also of an activated and limited power output in which the ignition power supplied to the ignition device is limited to a predetermined level. This is effected, however, by means of a switched-mode power supply in which the ignition current is held between a first and a second value of the current by opening and again closing the switching means accordingly. In the ignition circuit, a coil is needed for intermediate energy storage in order to be able to feed the supplied ignition power to the ignition device even when the switching means are open. This ignition circuit output stage thus makes possible the intended limitation of the supplied amount of power only by means of current limiting and requires not only numerous additional components, in particular a coil and a Schmitt trigger for the switched-mode power supply, but also an additional time limiting facility because otherwise an unlimited amount of power can be supplied over a period of time in spite of the limited current.

SUMMARY OF THE INVENTION

The object of the invention is to specify a method for operating a safety device that is accurate and independent of the conductor resistance. Furthermore, a suitable control unit will be presented.

A variable that is proportional to the current flowing through the triggering means has the decisive advantage of being equal everywhere in the ignition circuit and of being independent of the conductor resistance. Such a variable that is proportional to the current can be obtained very easily from an electrical circuit and, by squaring and integrating using both circuitry and software means, a variable can be determined from it that is proportional to the supplied power or energy and that is compared with a power or energy limiting value which, on being reached, results in the power being switched off. It is also possible supplying more than one triggering mean at the same time from one storage element for power supply by measuring the current through each triggering mean individually.

By programming the power or energy limiting value rather than predefining it from the start, a control unit can be adapted individually either immediately before installing it in the vehicle or even during the product life or depending on the present operating condition of the vehicle.

Furthermore, not only an activated or regulated mode but also a deactivated or unregulated mode can be provided which means that the control units can be used not only for vehicles with an activated (regulated) power supply but also for vehicles without it and additionally it is possible to deactivate the power limiting control under certain operating conditions.

DESCRIPTION OF THE PREFERRED EMBODIMENTS

Figure 1:
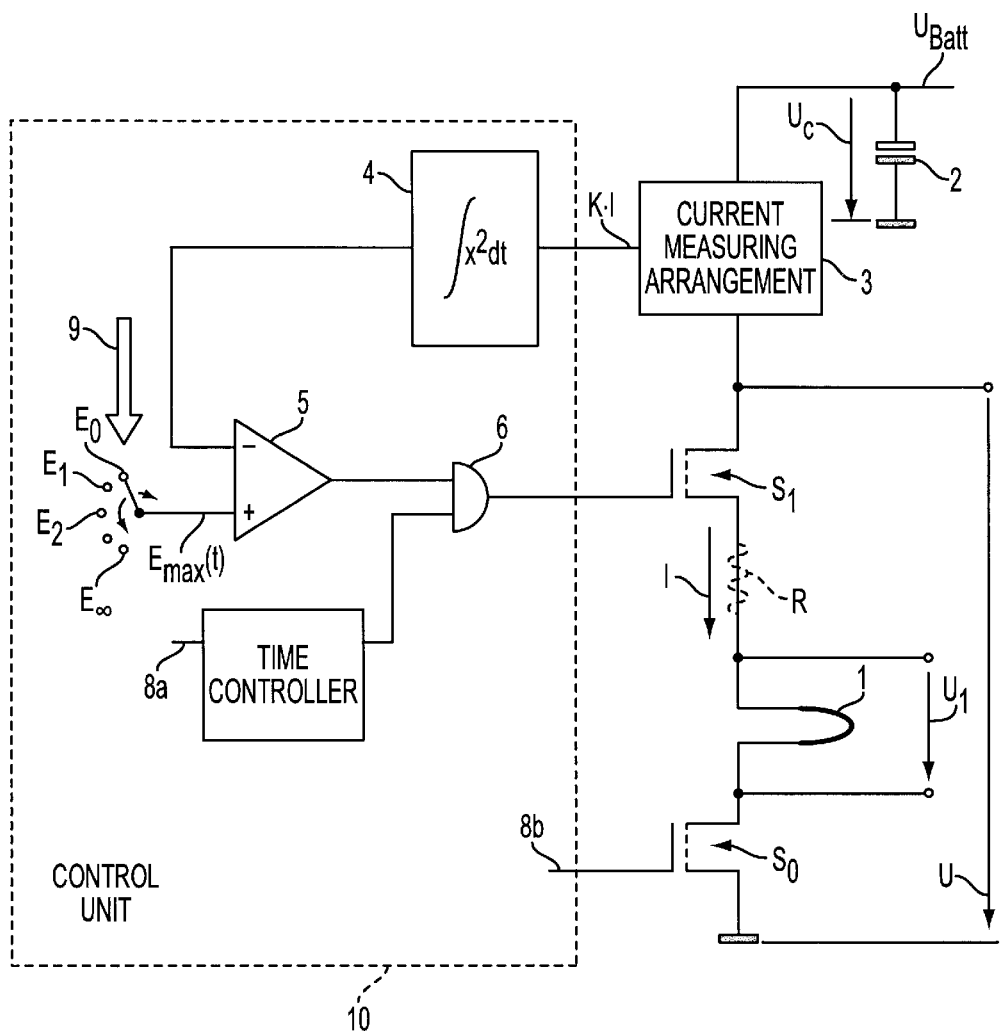
FIG. 1 is a block diagram showing a control unit for performing the method of the invention with a current measurement arrangement and a device for squaring and integrating the proportional variable.

The FIG. 1 shows in a block diagram a control unit for a pyrotechnical triggering means 1. The triggering means 1 is, for example, an ignitor of a gas generator for an airbag or a belt tightener. In the triggering circuit, the triggering means 1 is connected via a first switching means $S_1$ to the storage element 2 which is charged from a power supply voltage $U_{Batt}$. The triggering means 1 is connected with its second terminal via an additional low side switching means $S_2$ to ground. The low side switching means $S_0$ provides additional protection of the control unit but it is not essential.

In addition, a current measuring arrangement 3 is provided in the triggering ignition circuit that determines a variable k'I that is proportional to the current I flowing through the triggering means 1. This current measuring arrangement 3 can, for example, be in the form of a current mirror, the proportionality factor k being apart from a value of 1 for direct identity preferably considerably smaller, for example one hundredth.

This has been found to be advantageous because, due to the triggering means 1, a quite considerable current I flows at the time of triggering and, in order to implement circuitry for an energy limiting unit 10 with a device 4 for squaring and integrating the proportional variable k'1 that is associated with the current measuring arrangement, the requisite components (and in particular a capacitor required for the integration but not shown in further detail) can be designed with a considerably smaller size. Such circuitry developments of device 4 are state of the art.

Apart from a solution involving circuitry, a software solution of the energy limiting unit 10 is of course also possible by A/D converting the value k'1 that is proportional to the current 1 and further processing it numerically.

In the block diagram in the FIG. 1, in the energy limiting unit 10 the integral value E(t) at the output of the device 4 is now fed to a comparator 5 which compares the integral value E(t) with a specified power limiting value $E_{max}(t)$ and sets the comparator output to low if the integral value E(t) reaches the power limiting value $E_{max}$. Naturally, the power limiting value $E_{max}$ is adapted accordingly to the proportionality factor k of the value k'I. Triggering of such a control unit is by means of the control signals 8a and 8b with signal 8b being fed directly to the low side control means $S_0$ and the signal 8a initially to a time controller 7. At the output of the time controller 7, a high pulse is also set on the output side when there is a high pulse on signal 8a. Since the comparator 5 has a high pulse at the output until the power limiting value $E_{max}(t)$ has been reached through the integral value E(t), the logic element 6 will also set on the output side a high pulse to the switching means $S_1$ when there is a high pulse on the output of the time controller 7. Due to the high pulse at the switching means $S_0$ and $S_1$, the triggering ignition circuit is closed and the energy stored in the storage element 2 is fed to the triggering means 1 by means of current I. In parallel to the determination of energy described above, the time controller 7 measures the time over which the current flows and on reaching a predetermined maximum time it interrupts the supply of power irrespective of reaching the power limiting value $E_{max}(t)$ by changing from high pulse to low pulse on the output side. Since the logic element 6 performs an AND operation on the output signals from the time controller 7 and the comparator 5, it is immaterial which signal first reaches its threshold value.

If by comparison with the method described above one considers the voltage $U_c$ across the storage element 2 or the voltage U analogous to this across the switching means $S_1$ and $S_0$ and the triggering means 1, it becomes apparent that these voltages are extremely unsuitable for determining the real power supplied to the triggering means because these voltages U and $U_c$ differ quite considerably from the real voltage drop $U_1$ across the triggering means 1 when there is a relatively high conductor resistance indicated as R. The power supplied to the triggering means 1 can be determined reliably and control can be performed safely and successfully only by means of the method according to the invention for operating an occupant safety device based on the current I flowing through the triggering means 1.

The power limiting value $E_{max}(t)$ is preferably set by programming. This can be done immediately before installing the control unit in the vehicle which allows identical control units to be matched individually to different vehicle types. It is also conceivable to modify this power limiting value during the life of the product or indeed immediately before triggering in accordance with specific operating states, for instance the presently available voltage across the storage element and the number of triggering means. In the Figure, this programming has been provided symbolically by a switch 9 which switches one of the power limiting values E0, E1, E2 or E to the comparator 5. Naturally, in place of a switch 9, an equivalent n-bit coding of the power limiting value can be provided digitally.

The state E0 can, for example, represent deactivation of the triggering means, E1 and E2 can be selected in accordance with the version, and by use of E the deactivated nonregulated mode can be set by an "infinitely" large power limiting value. Switching over into the deactivated mode is of course also possible by other means, for instance by a second control function from the gate of switching means S1 that is independent of power supply and measurement.

Figure 2:
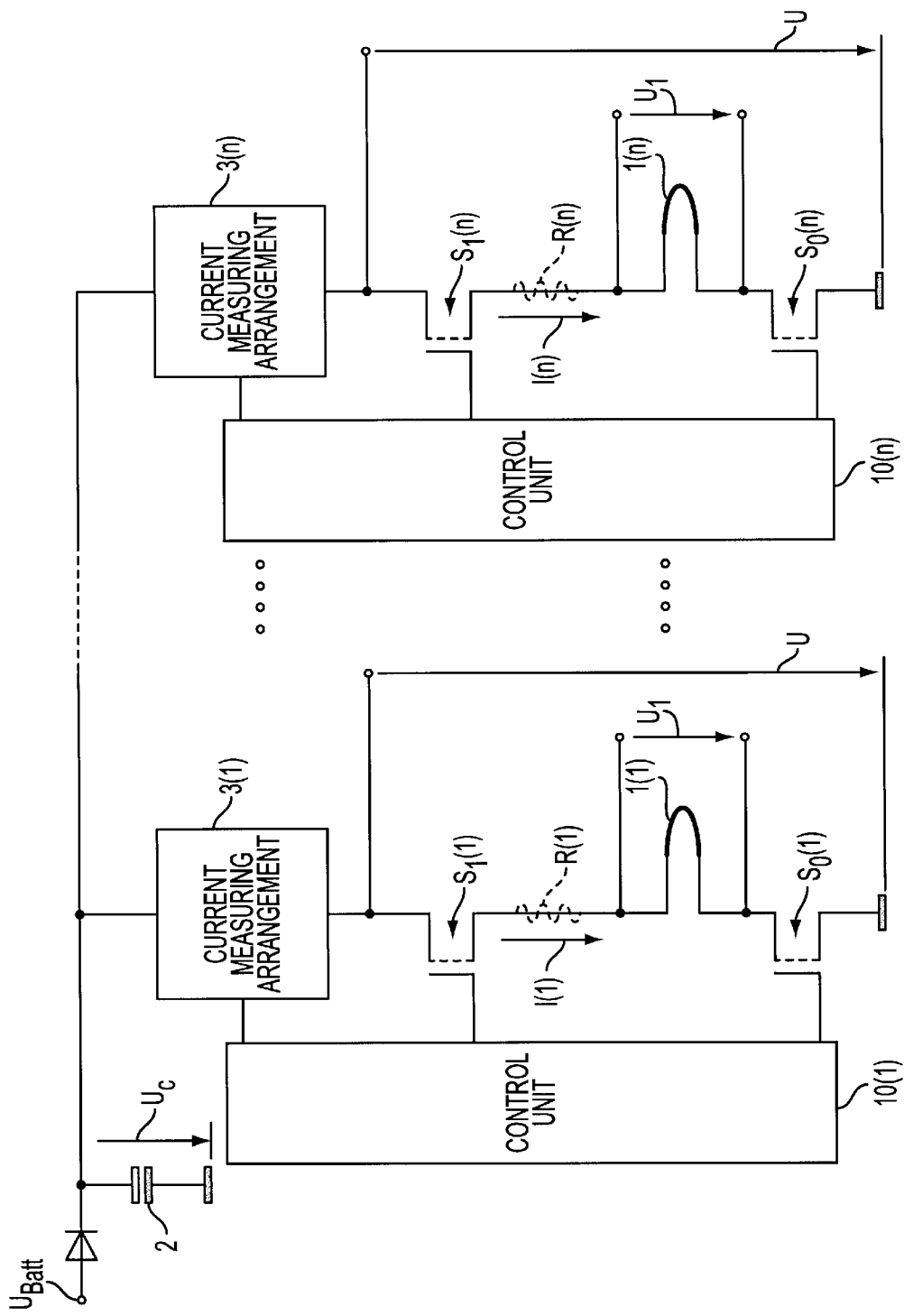
FIG. 2 shows an embodiment with one common storage element and a plurality of triggering means, supplied in parallel and with an individual predefined amount of energy.

FIG. 2 describes an embodiment with one common storage element 2 for a plurality of n triggering means 1(1)–1(n), supplied parallel and individual with an predefined amount of energy Emax. For this each triggering mean 1(1)–1(n) has its own current measuring arrangement 3(1)–3(n) and its own energy limiting unit 10(1)–10(n) so that each current 1(1)–1(n) through the triggering means 1(1)–1(n) can measured separately also at the same time. The power limiting value ($E_{max}$) for the triggering means (1(1)–1(n)) can be also defined individual for each triggering mean (1(1)–1(n)).

What is claimed is:

1. Method for operating an occupant safety device, in particular for motor vehicles, with a storage element for electrical power and at least one triggering means, that can be connected to the storage element, for restraint devices comprising: after operating each triggering means, measuring the power supplied to the triggering means; comparing a variable related to the measured power to a definable power limiting value and after reaching the definable power limiting value, interrupting the power supply to the previously operated triggering means; and wherein the variable that is compared is a variable that is proportional to the square of the current flowing through the triggering means and that is integrated to an integral value (E(t)).

2. Method in accordance with claim 1, wherein in addition to determining the power, determining the duration of the current flow, and if this duration exceeds a predefined maximum time, interrupting the power supply independently of reaching the determinable power limiting value.

3. Method in accordance with claim 1, wherein the power limiting value is set individually for each triggering means.

4. Method for operating an occupant safety device in accordance with claim 1, wherein
   a) an activated regulating mode is provided in which after operating each triggering means the power supplied to the respectively operated triggering means is measured and after reaching the definable power limiting value, the power supply to the respective operated triggering means is interrupted,
   b) a deactivated regulating mode is provided in which the triggering means is supplied in an unregulated manner from the storage element or directly from the vehicle electrical system, and
   c) selection between these modes for a respective triggering means is possible by programming of a control unit.

5. Method for operating an occupant safety device in accordance with claim 1, wherein
   a) the power supplied from one common storage element to a plurality of triggering means is measured individually for each triggering means,
   b) respective variables (E(t)) that are proportional to the square of the current (1(1)–I(n)) flowing through a respective triggering means integrated to an integrated value are provided,
   c) and the power supply is limited by comparing each respective variable with a respective power limiting value and individually interrupting the power supply for the respective triggering means after the respective power limiting value has been reached.

6. Control arrangement for a pyrotechnical triggering means for operating an occupant safety device for motor vehicles, comprising: a storage element for electrical power; at least one triggering means, that can be connected to the storage element, for a restraint device; and a control unit wherein after operating each triggering means, the power supplied to the triggering means is measured and after reaching a definable power limiting value, the power supply to the previously operated triggering means is interrupted and wherein the control unit includes:

a current measuring arrangement for determining a proportional variable (k'1) of the current flowing through the triggering means, a device for squaring and integrating the proportional variable to an integral value (E(t)), and a comparator that compares the integral value (E(t)) with a predefined power limiting value ($E_{max}$)) and if the integral value (E(t)) reaches the power limiting value ($E_{max}$)), provides an output signal to a switch that interrupts the power supply.

7. Control unit in accordance with claim 6, wherein the control unit includes means for adjusting the power limiting value by programming.

* * * * *